No. 721,554. PATENTED FEB. 24, 1903.
W. FETZER.
FERTILIZER DISTRIBUTER.
APPLICATION FILED JULY 14, 1902.
NO MODEL.
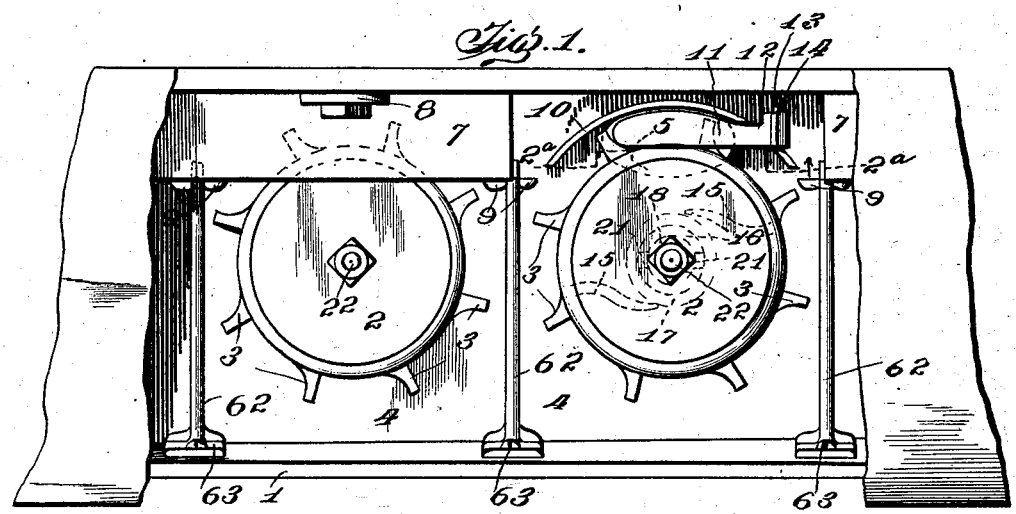
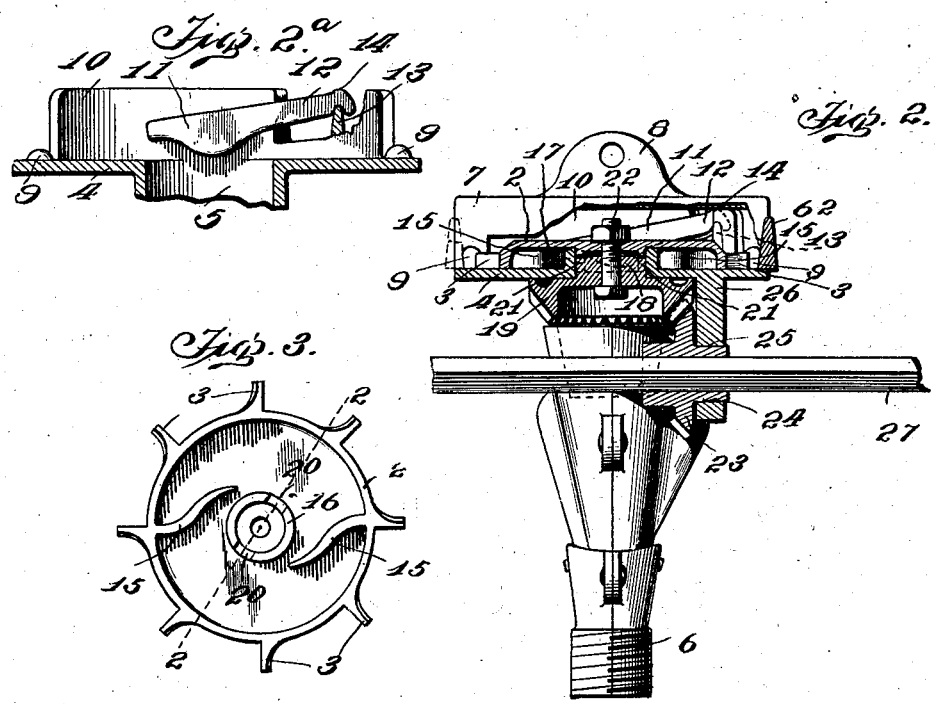

UNITED STATES PATENT OFFICE.

WILLIAM FETZER, OF MIDDLETOWN, OHIO.

FERTILIZER-DISTRIBUTER.

SPECIFICATION forming part of Letters Patent No. 721,554, dated February 24, 1903.

Application filed July 14, 1902. Serial No. 115,509. (No model.)

*To all whom it may concern:*

Be it known that I, WILLIAM FETZER, a citizen of the United States, residing at Middletown, in the county of Butler and State of Ohio, have invented certain new and useful Improvements in Fertilizer-Distributers; and I do hereby declare the following to be a full, clear, and exact description of the invention, such as will enable others skilled in the art to which it appertains to make and use the same.

This invention relates to improvements in fertilizer distributers or drills, and more particularly to that class of fertilizer-distributers in which a series of feed-disks are employed in a hopper for forcing the fertilizer in predetermined quantities to the discharge-outlets leading to the drill-tubes.

The object of the present invention is to so construct feed disks or wheels within the hopper that they may keep themselves more perfectly clear of material which might work beneath the edges of said disks and to so mount and operate the disks that the friction will be reduced to a minimum.

With these and other objects in view the present invention consists in certain novel constructions, combinations, and arrangements of parts, as will be hereinafter fully described and claimed.

In the accompanying drawings, Figure 1 is a plan view of a portion of a feed-hopper of a fertilizer-distributer, showing feed disks or wheels in position therein. Fig. 2 is a vertical section through a portion of said feeding device, taken on a line passing through the center of one of the feed disks or wheels and showing the actuating-gearing for operating the said feed-disk. Fig. 2ª is a detail sectional view taken on the line 2ª 2ª of Fig. 1. Fig. 3 is an inverted plan view of one of the feed disks or wheels.

Referring now to the illustration, the feed-hopper 1 may be made in any usual or well-known manner and is provided at intervals along its floor with feed wheels or disks 2, which have radially-projecting teeth 3, traveling over the floor-plate 4 and also over the outlet-openings 5 in said floor-plates 4, the outlet-openings leading to the upper ends of conducting-tubes 6, as seen in Fig. 2. As will also be seen in said Fig. 2, the feed disks or wheels 2 are mounted so that their lower edges rest closely upon the upper face of the floor-plates 4, the projecting arms or teeth 3 also resting closely upon the said floor. The central portion of the feed disks or wheels 2 is somewhat higher than the depth of the teeth or arms 3 and is hollow underneath. The periphery of each feed disk or wheel 2, together with the arms or teeth 3, travels beneath a shed or housing 7, which is arranged over each one of the openings 5 in the hopper. These sheds are of an angular shape and are provided with fastening lugs or projections 8, which may be secured to the sides of the hopper 1 to hold the said sheds or housings in position. The inner edges of the housings engage lugs 9 upon the floor-plates 4 for holding the said housings in proper position with respect to the feed disks or wheels 2. While one long shed might be employed extending over a number of the outlet-openings 5 and the feed-wheels 2, yet I preferably provide a separate shed or housing 7 for each feed-disk 2, each of said sheds abutting at its ends against the ends of the next adjoining sheds 7, as shown in Fig. 1. Beneath the shed and arranged just outside the opening or outlet-aperture 5 is a curved plate or partition 10 for directing the fertilizer, which is brought beneath the shed by the arms or teeth 3 of the wheels 2, so that it will fall into the outlet-aperture 5. There is also beneath each of these sheds a pivoted knocker 11, which has one end extending loosely over the aperture 5, and its other end is formed with a curved half-bearing 12 upon its under side, engaging the rounded upper edge of a wall or standard 13, rising from the floor-plate 4. The upper edge of the half-bearing 12 is made somewhat prominent, being formed with a ridge 14, which engages the under side of the shed 7. The shed is thus enabled to hold the half-bearing in position upon the standard 13 and yet permit it to have a pivotal movement thereon. The under side of the knocker 11 is rounded somewhat, so that the teeth or arms 3 of the feed-wheel can raise the said knocker as they pass beneath it. The knocker will drop from the teeth toward the aperture again, thus tending to prevent the fertilizer from clogging at the mouth of the outlet and insuring its dropping through the same into the conducting-tube beneath.

The shape and mounting of the feed-wheels forms an important feature of the present invention. Besides having their peripheral edges and arms or teeth fitting snugly upon the upper surface of the floor 4 each of the said disks or wheels is formed with inwardly-extending ribs upon their under surface, as 15. These ribs extend somewhat tangentially with respect to the inner downwardly-projecting hub 16 of the said wheel, but preferably do not touch the same, leaving a slight space between the inner ends of the said ribs and the said hub. The lower surfaces of these ribs are flush with the peripheral edges of the said wheel, so that the said ribs also travel smoothly and closely over the upper surface of the floor-plate 4. These tangentially-arranged ribs are so positioned that should any material from the hopper work beneath the edges of the feed-wheel it will be collected by the said ribs and worked gradually toward the periphery of the wheel, so as to be brought over the outlet-openings 5 and permitted to drop therein. In this manner the feed-wheels are enabled to keep themselves entirely clear of all clogging and free to work easily over the floor-plate 4.

The hub 16 of each of the wheels 2 is arranged to fit within the upwardly-projecting flange 17, arranged around the opening formed in the floor-plate 4. This hub 16 is preferably hollow and receives the reduced upper end of an upwardly-extending hub 18, carried by an actuating beveled gear-wheel 19, arranged upon the under side of the floor-plate 4. The hub 16 is provided with notches 20, which engage lugs 21 upon the upper end of the hub 18, so that when said hub 18 is rotated with the wheels 19 the hub 16 will be turned and the feed-wheel 2 carried around thereby. A bolt 22 is passed through the hub 18 and a central aperture in the wheel 2 for securing the parts snugly in position. The gear-wheel 19 and the feed-wheel 2 are spaced apart, however, by means of the hubs 18 and 16, so that there will be no binding action of the feed-wheel 2 against the flange 17.

The beveled gear-wheel 19 meshes with an actuating-pinion 23. The gear-wheel 23 is formed with a hub 24, which fits in a bearing 25, formed in a supporting-hanger 26, depending from the under surface of the floor 4. The actuating-gear 23 is held in position in its bearing 25 by the gear-wheel 19. Each of the gear-wheels 23 is formed with a squared central opening fitting upon a squared shaft 27. The squared shaft 27 extends along underneath the fertilizer-hopper 1 and through the gear wheels or pinions 23 beneath each of the feed-wheels 2, so that by actuating or rotating the said squared shaft 27 all of the gears 23 will be rotated for driving their respective feed-wheels 2.

In using a fertilizer-distributer of this character, in which a number of feed-wheels are employed in the bottom of a hopper, all traveling in the same direction, I have found that the tendency is to move the mass of the fertilizer in the hopper gradually toward one end thereof even to the extent of overflowing the hopper at that end. To obviate this difficulty, I provide my hopper with a series of comparatively low partitions 62, which are provided with securing-lugs, as 63, at one end of which they may be attached to the side of the fertilizer-hopper 1. The said partitions extend transversely across the hopper, between adjacent feed-wheels, to the housings 7. These partitions 62 are preferably as high or a little higher than the feed-wheels 2. I find in use that these partitions entirely prevent the working of the mass of the fertilizer in the hopper toward one end or the other of the said hopper.

It will be evident that the parts of my improved fertilizer-distributer are comparatively simple and that they can be made so as to most effectively distribute the desired quantity of fertilizer whether that quantity be large or small.

Having thus fully described my invention, what I claim as new, and desire to secure by Letters Patent, is—

1. In a fertilizer-distributer, the combination with a suitable hopper, of a series of feed-wheels mounted therein, the feed-wheels being hollow upon their under side, tangentially-arranged ribs upon the under side of each feed-wheel extending from points near the hub thereof to the outer periphery of the wheel for carrying material which may work beneath the walls outwardly to the discharge-passage beneath the periphery of the wheel, substantially as described.

2. In a fertilizer-distributer, the combination with a suitable hopper of feed-wheels mounted therein having feeding-teeth on their periphery, the lower edges of said teeth and the peripheral edges of the wheels closely engaging the floor-plate of the hopper, a gear-wheel beneath the floor of the hopper for actuating each drive-wheel, a hub extending upwardly therefrom, a depending hub upon the under side of each feed-wheel engaging the hub of the driving-disk, and means for holding the two together, the said feed-wheels being thus supported so as to cause a minimum of friction in the operation of the parts, substantially as described.

3. In a fertilizer-distributer, the combination with a hopper of a series of feed-wheels, means for rotating the same and partitions mounted upon the floor of the hopper between the said feed-wheels for preventing the material from working toward one end or the other of the hopper, said partitions being of a much less height than the hopper-walls, substantially as described.

4. In a fertilizer-distributer, the combination with a hopper, of a series of feed-wheels mounted therein, pinions for driving the same, a shed covering one edge of the said feed-wheel, a knocker pivoted beneath the said shed, the said knocker having a half-bearing at its pivoted end, a wall projecting from the floor of the hopper engaging said half-bearing and a projection on the upper side of the half-bearing engaging the under side of the shed, the said knocker being thus movably held in position, substantially as described.

5. In a fertilizer-distributer, the combination with a hopper, of a series of feed-wheels operating upon the bottom thereof, a series of partitions extending about the height of said feed-wheels upon the floor of the bottom, the said partitions being arranged between the feed-wheels for preventing material in the hopper from working all to one end thereof, substantially as described.

6. In a fertilizer-distributer, the combination with a hopper, of a series of feed-wheels moving in the bottom thereof, upwardly-projecting annular flanges surrounding openings in the floor of the hopper beneath said wheels, a notched hub projecting into said flanged opening from each feed-wheel, a gear-wheel for actuating each feed-wheel arranged below the floor of the hopper, hubs provided with projecting lugs extending upwardly into the apertures beneath the feed-wheels, and meeting the notched hubs of the feed-wheels, the lugs engaging said notches, and turning the feed-wheels, and means for holding the feed-wheels and gear-wheels together, substantially as described.

In testimony whereof I hereunto affix my signature in presence of two witnesses.

WILLIAM FETZER.

Witnesses:
  A. C. FREEZE,
  G. R. BROOKS.